United States Patent
Ko et al.

(10) Patent No.: US 8,699,470 B2
(45) Date of Patent: Apr. 15, 2014

(54) APPARATUS AND METHOD FOR TRANSMITTING DATA IN A MULTI-ANTENNA SYSTEM

(75) Inventors: Hyun Soo Ko, Gyeongki-do (KR); Seung Hee Han, Gyeongki-do (KR); Jea Hoon Chung, Gyeongki-do (KR); Yeong Hyeon Kwon, Gyeongki-do (KR); Bin Chul Ihm, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 13/132,220

(22) PCT Filed: Oct. 7, 2009

(86) PCT No.: PCT/KR2009/005723
§ 371 (c)(1), (2), (4) Date: Jun. 1, 2011

(87) PCT Pub. No.: WO2010/098525
PCT Pub. Date: Sep. 2, 2010

(65) Prior Publication Data
US 2012/0027004 A1  Feb. 2, 2012

Related U.S. Application Data

(60) Provisional application No. 61/155,899, filed on Feb. 26, 2009.

(30) Foreign Application Priority Data

Sep. 8, 2009 (KR) .................. 10-2009-0084317

(51) Int. Cl.
H04B 7/216 (2006.01)

(52) U.S. Cl.
USPC .......................... 370/335; 370/344

(58) Field of Classification Search
USPC ................... 370/344, 335
See application file for complete search history.

(56) References Cited

U.S. PATENT DOCUMENTS

| | | | |
|---|---|---|---|
| 2008/0095252 A1 | 4/2008 | Kim et al. | |
| 2008/0192849 A1* | 8/2008 | Kim et al. | 375/260 |
| 2010/0254253 A1* | 10/2010 | Sun et al. | 370/210 |

FOREIGN PATENT DOCUMENTS

WO  2007/145492  12/2007

OTHER PUBLICATIONS

International Search Report from PCT/KR2009/005723 (PCT corresponding to present application).

* cited by examiner

Primary Examiner — Sai-Ming Chan
(74) Attorney, Agent, or Firm — Morgan, Lewis & Bockius LLP

(57) ABSTRACT

A method and an apparatus for transmitting data in a multi-antenna system are provided. The method includes: selecting a plurality of modulation symbol blocks including at least one modulation symbol from total modulation symbols of a codeword, repeating the plurality of modulation symbol blocks in a time domain, combining the repeated plurality of modulation symbol blocks, and performing discrete Fourier transform (DFT) on the combined plurality of modulation symbol blocks.

10 Claims, 9 Drawing Sheets

APPARATUS AND METHOD FOR TRANSMITTING DATA IN A MULTI-ANTENNA SYSTEM

The present application is a national stage of PCT International Application No. PCT/KR2009/005723, filed Oct. 7, 2009, and claims the benefit of U.S. Provisional Application No. 61/155,899, filed Feb. 26, 2009. The present national stage application also claims the benefit of Korean Patent Application No. 10-2009-0084317, filed Sep. 8, 2009.

TECHNICAL FIELD

The present invention relates to wireless communications, and more particularly, to an apparatus and method for transmitting data in a multi-antenna system.

BACKGROUND ART

To maximize performance and communication capability of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes Tx diversity, spatial multiplexing, and beamforming. The Tx diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

Meanwhile, an orthogonal frequency division multiplexing (OFDM) system capable of reducing inter-symbol interference with a low complexity is taken into consideration as one of post-$3^{rd}$ generation wireless communication systems. In the OFDM, a serially input data symbol is converted into N parallel data symbols, and is then transmitted by being carried on N orthogonal subcarriers. The subcarriers maintain orthogonality in a frequency dimension. An orthogonal frequency division multiple access (OFDMA) is a multiple access scheme for achieving multiple access by independently providing some of available subcarriers to each user in a system using the OFDM as a modulation scheme.

One of main problems of the OFDM/OFDMA system is that a cubic metric (CM) or a peak-to-average power ratio (PAPR) can be significantly large. The CM or PAPR problem occurs when a peak amplitude of a Tx signal is significantly larger than an average amplitude, and is caused by a fact that an OFDM symbol is an overlap of N sinusoidal signals on different subcarriers. The CM or PAPR is particularly problematic in a user equipment (UE) which is sensitive to power consumption in association with battery capacity. It is important to decrease the CM or PAPR in order to decrease power consumption.

Single carrier-frequency division multiple access (SC-FDMA) is proposed to decrease the CM or PAPR. The SC-FDMA is frequency division multiple access (FDMA) combined with single carrier-frequency division equalization (SC-FDE). The SC-FDMA is similar to the OFDMA in that data is modulated and demodulated in a time domain and a frequency domain by using discrete Fourier transform (DFT). However, the SC-FDMA is advantageous to decrease Tx power since a Tx signal has a low PAPR. In particular, it can be advantageous in uplink transmission from a UE which is sensitive to Tx power in regards to the use of battery to a BS. When the UE transmits data to the BS, the transmitted data does not have a great bandwidth but it is important to provide a wide coverage capable of concentrating power. The SC-FDMA system is designed to have a small signal variation, and thus has a wider coverage than other systems when the same power amplifier is used.

Meanwhile, unlike the SC-FDMA scheme, the clustered DFT-spread-OFDM (DFT-S-OFDM) allocates (or maps) M(<N) symbol streams among N symbol streams which are DFT spread to consecutive subcarriers, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

However, a single-carrier property has to be satisfied when applying the SC-FDMA scheme. The wireless communication system must be able to provide Tx diversity for decreasing the CM or PAPR by using the SC-FDMA scheme or the clustered DFT-S-OFDM scheme.

There is a need for a data transmission apparatus and method capable of providing the Tx diversity while maintaining the single-carrier property.

SUMMARY OF INVENTION

Technical Problem

The present invention provides a data transmission apparatus and method capable of implementing transmit (Tx) diversity while maintaining a single-carrier property.

Technical Solution

According to an aspect of the present invention, an apparatus for transmitting data in a multi-antenna system is provided. The apparatus includes: a scrambling unit for performing scrambling on an input codeword; a modulator for arranging the scrambled codeword to a modulation symbol that expresses a position on a signal constellation; a transform precoder for performing discrete Fourier transform (DFT) on the modulation symbol to generate a DFT symbol of a frequency domain; a resource element mapper for mapping the DFT symbol to a physical resource element; and a single carrier-frequency division multiple access (SC-FDMA) signal generator for generating an SC-FDMA signal of a time domain from the DFT symbol mapped to the resource element, wherein the modulation symbol is selected in the time domain as a plurality of modulation symbol blocks, and the selected modulation symbol blocks are input to the transform precoder after being combined repetitively According to another aspect of the present invention, a method of performing DFT to transmit an SC-FDMA symbol is provided. The method includes: selecting a plurality of modulation symbol blocks including at least one modulation symbol from total modulation symbols of a codeword; repeating the plurality of modulation symbol blocks in a time domain; and performing transform precoding by combining the repeated plurality of modulation symbol blocks.

Advantageous Effects

According to the present invention, transmit (Tx) diversity can be implemented in a wireless communication system while maintaining a single-carrier property.

MODE FOR INVENTION

Figure 1:
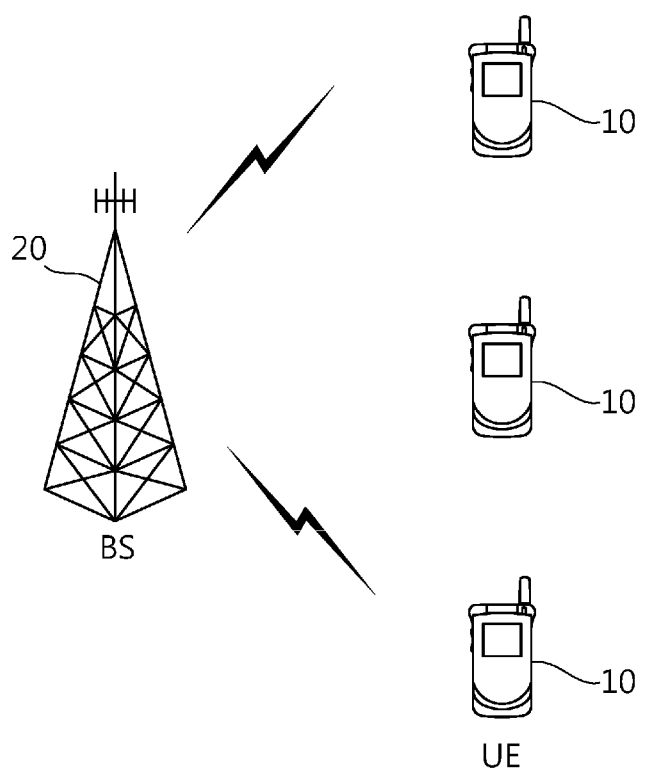
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS to the UE, and an uplink (UL) denotes a communication link from the UE to the BS. In the DL, a transmitter may be a part of the BS 20, and a receiver may be a part of the UE 10. In the UL, the transmitter may be a part of the UE 10, and the receiver may be a part of the BS 20.

The wireless communication system may be a system based on orthogonal frequency division multiplexing (OFDM)/orthogonal frequency division multiple access (OFDMA). The OFDM uses a plurality of orthogonal subcarriers. Further, the OFDM uses an orthogonality between inverse fast Fourier transform (IFFT) and fast Fourier transform (FFT). The transmitter transmits data by performing IFFT on the data. The receiver restores original data by performing FFT on a received signal. The transmitter uses IFFT to combine the plurality of subcarriers, and the receiver uses FFT to split the plurality of subcarriers.

A multiple access scheme may be different between DL transmission and UL transmission. For example, OFDMA can be used in DL transmission, and single carrier-frequency division multiplex access (SC-FDMA) or clustered discrete Fourier transform (DFT)-spread-OFDM (DFT-S-OFDM) can be used in UL transmission. In a typical SC-FDMA scheme, DFT-spread symbol streams are allocated (or mapped) to contiguous subcarriers or equidistantly-spaced subcarriers. In the clustered DFT-S-OFDM scheme, among N symbol streams which are DFT-spread, M(<N) symbol streams are allocated (or mapped) to contiguous subcarriers, and the remaining N-M symbol streams are allocated (or mapped) to contiguous subcarriers which are spaced apart by a specific distance from a subcarrier to which M symbol streams are allocated (or mapped). When using the clustered DFT-S-OFDM scheme, there is an advantage in that a frequency selective scheduling gain can be obtained.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched Tx diversity (FSTD), time switched Tx diversity (TSTD), etc. In case of a rank 2 or higher ranks, the scheme may be spatial multiplexing (SM), generalized cyclic delay diversity (GCDD), selective virtual antenna permutation (S-VAP), etc.

The SFBC is a scheme for effectively applying selectivity in a space domain and a frequency domain to ensure both a diversity gain in a corresponding dimension and a multi-user scheduling gain. The STBC is a scheme for applying selectivity in the space domain and a time domain. The FSTD is a scheme in which signals transmitted to multiple antennas are divided based on frequency, and the TSTD is a scheme in which signals transmitted to multiple antennas are divided based on time. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
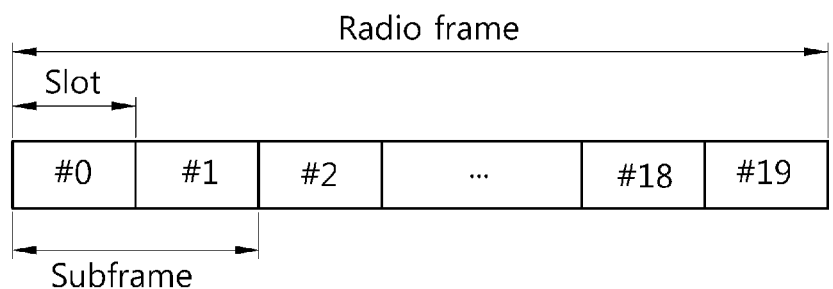
FIG. 2 shows a radio frame structure.

FIG. 2 shows a radio frame structure.

Referring to FIG. 2, a radio frame consists of 10 subframes, and one subframe consists of two slots. A transmission time interval (TTI) is defined as a time for transmitting one subframe. For example, one subframe may have a length of 1 millisecond (ms), and one slot may have a length of 0.5 ms. One slot includes a plurality of SC-FDMA symbols in a time domain, and includes a plurality of resource blocks in a frequency domain.

The structure of the radio frame is for exemplary purpose only, and the number of subframes included in the radio frame or the number of slots included in the subframe and the number of SC-FDMA symbols included in the slot can change variously.

Figure 3:
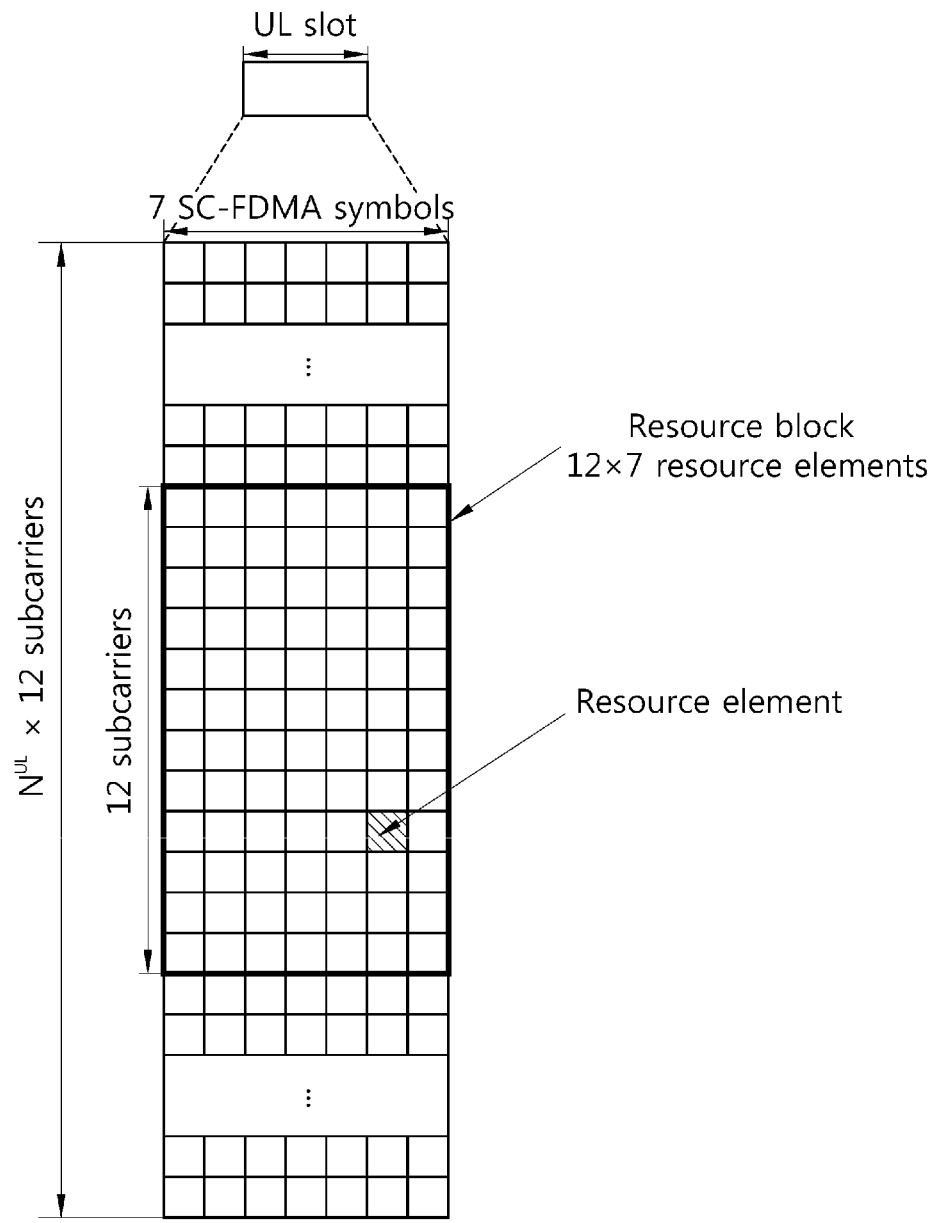
FIG. 3 is a diagram showing an example of a resource grid for one uplink slot.

FIG. 3 is a diagram showing an example of a resource grid for one UL slot.

Referring to FIG. 3, the UL slot includes a plurality of SC-FDMA symbols in a time domain, and includes a plurality of resource blocks in a frequency domain. Although it is described herein that one UL slot includes 7 SC-FDMA symbols and one resource block includes 12 subcarriers, the present invention is not limited thereto.

Each element on the resource grid is referred to as a resource element. One resource block includes 12×7 resource elements. The number $N^{UL}$ of resource blocks included in the UL slot depends on a UL transmission bandwidth defined in a cell.

Figure 4:
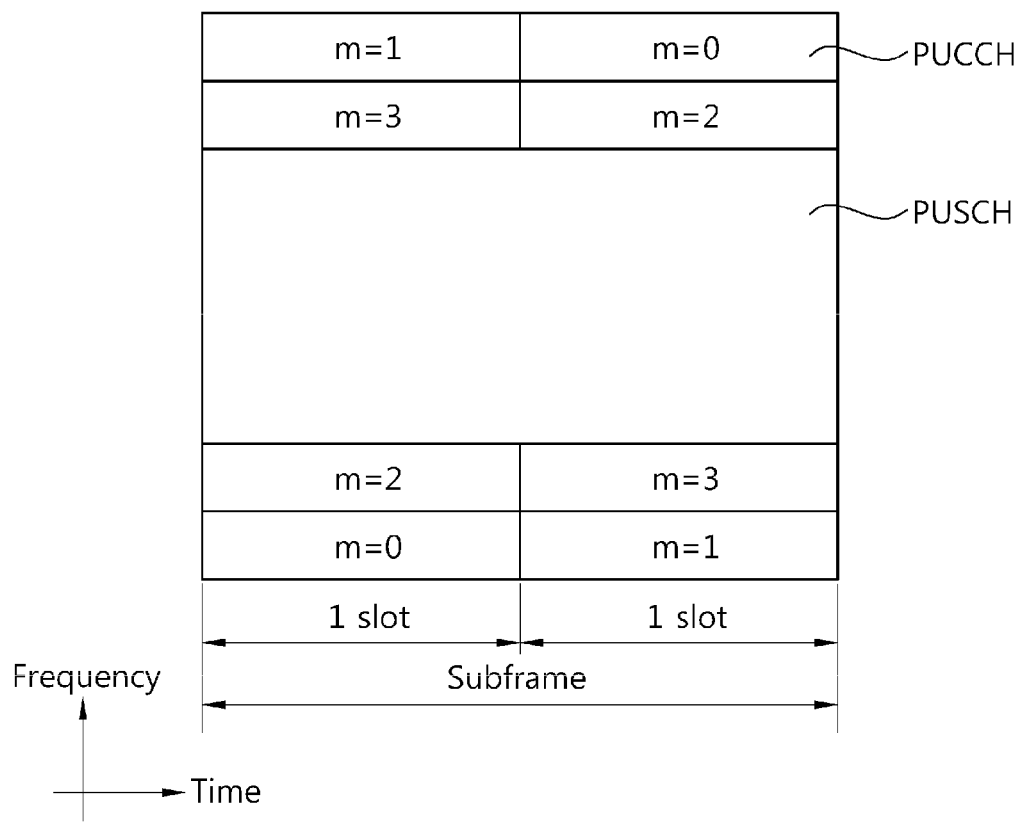
FIG. 4 shows an example of an uplink subframe structure.

FIG. 4 shows an example of a UL subframe structure.

Referring to FIG. 4, a UL subframe can be classified into a control region to which a physical uplink control channel (PUCCH) for carrying UL control information is allocated and a data region to which a physical uplink shared channel (PUSCH) for carrying user data or control information is allocated. The data region is allocated to a middle portion of the subframe, and the control region is allocated to both sides of the data region. One UE does not transmit the control information and the user data simultaneously through the control region and the data region. Examples of the UL control information transmitted through the PUCCH include an acknowledgement (ACK)/not-acknowledgement (NACK) signal, a channel quality indicator (CQI), a precoding matrix index (PMI), a rank indicator (RI), a radio resource allocation request signal, etc.

The PUCCH for one UE uses one resource block that occupies a different frequency at each of two slots of a subframe. That is, the two slots of different resource blocks (or subcarriers) are used in the subframe. Therefore, the two resource blocks assigned to the PUCCH are frequency hopped in a slot boundary. Herein, a PUCCH (m=0), a PUCCH (m=1), a PUCCH (m=2), and a PUCCH (m=3) are assigned to the subframe, which is for exemplary purposes only.

The PUCCH can support multiple formats. That is, UL control information having a different number of bits per subframe can be transmitted according to a modulation scheme. For example, when using binary phase shift keying (BPSK), 1-bit UL control information can be transmitted through the PUCCH, and when using quadrature phase shift keying (QPSK), 2-bit UL control information can be transmitted through the PUCCH.

Figure 5:
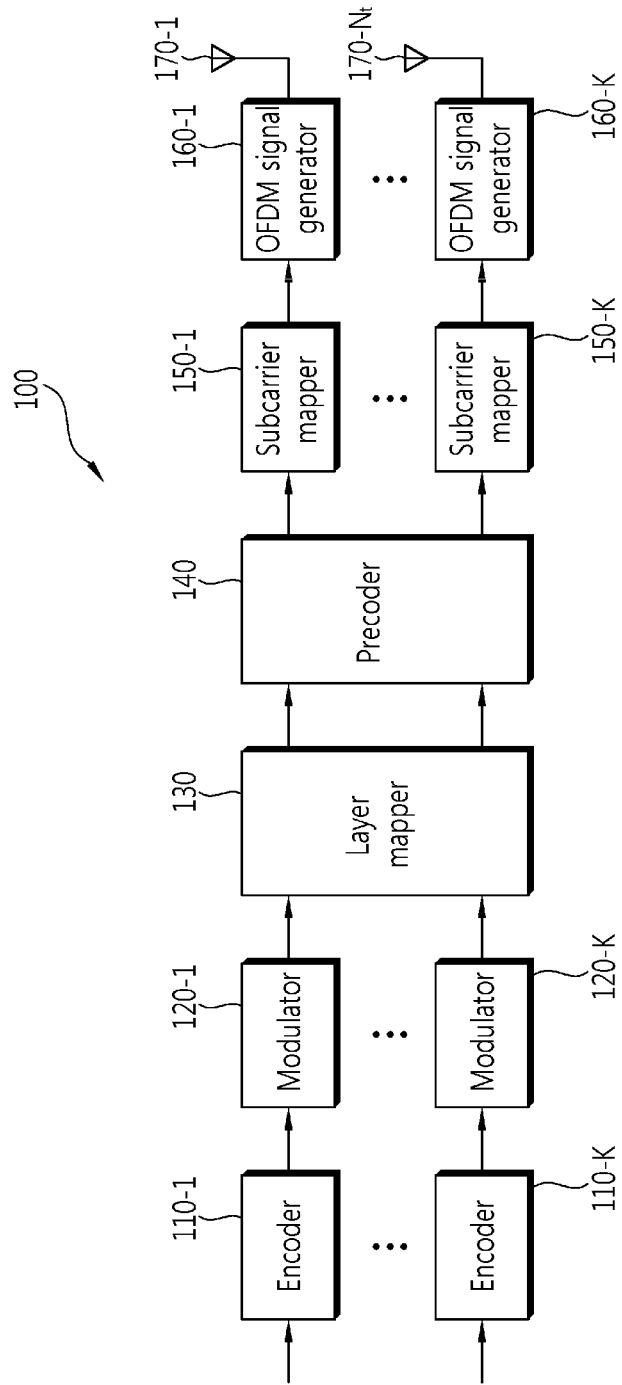
FIG. 5 shows an exemplary structure of a transmitter.

FIG. 5 shows an exemplary structure of a transmitter. This structure can be used for DL transmission using an OFDMA access scheme.

Referring to FIG. 5, a transmitter 100 includes encoders 110-1, . . . , 110-K, modulators 120-1, . . . , 120-K, a layer mapper 130, a precoder 140, subcarrier mappers 150-1, . . . , 150-K, and OFDM signal generators 160-1, . . . , 160-K. The transmitter 100 also includes Nt (Nt>1) Tx antennas 170-1, . . . , 170-Nt.

The encoders 110-1, . . . , 110-K generate coded data by encoding input data according to a predetermined coding scheme. The coded data is referred to as a codeword. A codeword b can be expressed by Equation 1 below.

$$b^{(q)}(0), \ldots, b^{(q)}(M_{bit}^{(q)}-1) \quad \text{[Equation 1]}$$

In Equation 1, q denotes a codeword index, and $M_{bit}^{(q)}$ denotes the number of bits of the codeword q.

Scrambling is performed on the codeword. A scrambled codeword c can be expressed by Equation 2 below.

$$c^{(q)}(0), \ldots, c^{(q)}(M_{bit}^{(q)}-1) \quad \text{[Equation 2]}$$

The modulators 120-1, . . . , 120-K arrange the codeword into a symbol that expresses a position on a signal constellation. A modulation scheme is not limited to a specific modulation scheme, and may be an m-phase shift keying (m-PSK) or an m-quadrature amplitude modulation (m-QAM). For example, the m-PSK may be binary PSK (BPSK), quadrature PSK (QPSK), or 8-PSK. The m-QAM may be 16-QAM, 64-QAM, or 256-QAM.

A codeword d arranged to the symbol on the signal constellation can be expressed by Equation 3 below.

$$d^{(q)}(0), \ldots, d^{(q)}(M_{symb}^{(q)}-1) \quad \text{[Equation 3]}$$

In Equation 3, $M_{symb}^{(q)}$ denotes the number of symbols of the codeword q.

The layer mapper 130 defines a layer of an input symbol so that an antenna-specific symbol can be distributed to a path of each antenna. The layer is defined as an information path input to the precoder 140. A symbol x input to the path of each antenna can be expressed by Equation 4 below.

$$x(i)=[x^{(0)}(i) \ldots x^{(v-1)}(i)]^T \quad \text{[Equation 4]}$$

In Equation 4, i=0, 1, . . . , $M_{symb}^{layer}-1$. v denotes the number of layers, and $M_{symb}^{layer}$ denotes the number of modulation symbols per layer.

A single layer v=1 is used in single-antenna transmission, and mapping for the single layer is defined by Equation 5 below.

$$x^{(0)}(i)=d^{(0)}(i) \quad \text{[Equation 5]}$$

In Equation 5, $M_{symb}^{layer}=M_{symb}^{(0)}$.

For spatial multiplexing, a codeword can be mapped according to Table 1 below.

TABLE 1

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}/2$ |
| 2 | 2 | $x^{(0)}(i) = d^{(0)}(i)$ <br> $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ <br> $x^{(1)}(i) = d^{(0)}(2i + 1)$ | $M_{symb}^{layer} = M_{symb}^{(0)}/2$ |
| 3 | 3 | $x^{(0)}(i) = d^{(0)}(i)$ <br> $x^{(1)}(i) = d^{(1)}(i)$ <br> $x^{(2)}(i) = d^{(2)}(i)$ | $M_{symb}^{layer} = M_{symb}^{(0)} = M_{symb}^{(1)} = M_{symb}^{(2)}$ |
| 3 | 2 | $x^{(0)}(i) = d^{(0)}(i)$ <br> $x^{(1)}(i) = d^{(1)}(2i)$ <br> $x^{(2)}(i) = d^{(1)}(2i + 1)$ | $M_{symb}^{layer} = M_{symb}^{(0)} = M_{symb}^{(1)}/2$ |
| 3 | 1 | $x^{(0)}(i) = d^{(0)}(3i)$ <br> $x^{(1)}(i) = d^{(0)}(3i + 1)$ <br> $x^{(2)}(i) = d^{(0)}(3i + 2)$ | $M_{symb}^{layer} = M_{symb}^{(0)}/3$ |
| 4 | 4 | $x^{(0)}(i) = d^{(0)}(i)$ <br> $x^{(1)}(i) = d^{(1)}(i)$ <br> $x^{(2)}(i) = d^{(2)}(i)$ <br> $x^{(3)}(i) = d^{(3)}(i)$ | $M_{symb}^{layer} = M_{symb}^{(0)} = M_{symb}^{(1)} = M_{symb}^{(2)} = M_{symb}^{(3)}$ |

TABLE 1-continued

| Number of layers | Number of codewords | Codeword-to-layer mapping $i = 0, 1, \ldots, M_{symb}^{layer} - 1$ | |
|---|---|---|---|
| 4 | 3 | $x^{(0)}(i) = d^{(0)}(i)$<br>$x^{(1)}(i) = d^{(1)}(i)$<br>$x^{(2)}(i) = d^{(2)}(2i)$<br>$x^{(3)}(i) = d^{(2)}(2i+1)$ | $M_{symb}^{layer} = M_{symb}^{(0)} = M_{symb}^{(1)} = M_{symb}^{(2)}/2$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} = M_{symb}^{(0)}/4$ |

For Tx diversity, the codeword can be mapped according to Table 2 below.

TABLE 2

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} =$<br>$\begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$<br>If $M_{symb}^{(0)} \bmod 4 \neq 0$ two null symbols shall be appended to $d^{(0)}(M_{symb}^{(0)} - 1)$ |

A single codeword is used, and the number v of layers is equal to the number P of antennas used in transmission of a physical channel.

The information path located ahead of the precoder 140 can be called a virtual antenna (or a layer). The precoder 140 processes an input symbol by using a MIMO scheme according to the multiple Tx antennas 170-1, ..., 170-Nt. For example, the precoder 140 can use codebook-based precoding. The precoder 140 distributes an antenna-specific symbol to the subcarrier mappers 150-1, ..., 150-K for a path of a specific antenna. Each information path transmitted to one antenna by the precoder 140 by the use of one subcarrier mapper is called a stream. The antenna may be a physical antenna.

A signal $y^{(p)}(i)$ sent to each antenna port p can be expressed by Equation 6 below.

$$y(i) = [\ldots y^{(p)}(i) \ldots]^T \quad \text{[Equation 6]}$$

The subcarrier mappers 150-1, ..., 150-K allocate input symbols to relevant subcarriers and then multiplex the resultant symbols according to a user. The OFDM signal generators 160-1, ..., 160-K modulate input symbols according to an OFDM scheme and then outputs OFDM symbols. The OFDM signal generators 160-1, ..., 160-K can perform IFFT on input symbols. A cyclic prefix (CP) may be inserted into a time-domain symbol which has undergone the IFFT. The OFDM symbols are transmitted through the respective Tx antennas 170-1, ..., 170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than or equal to 2.

Figure 6:
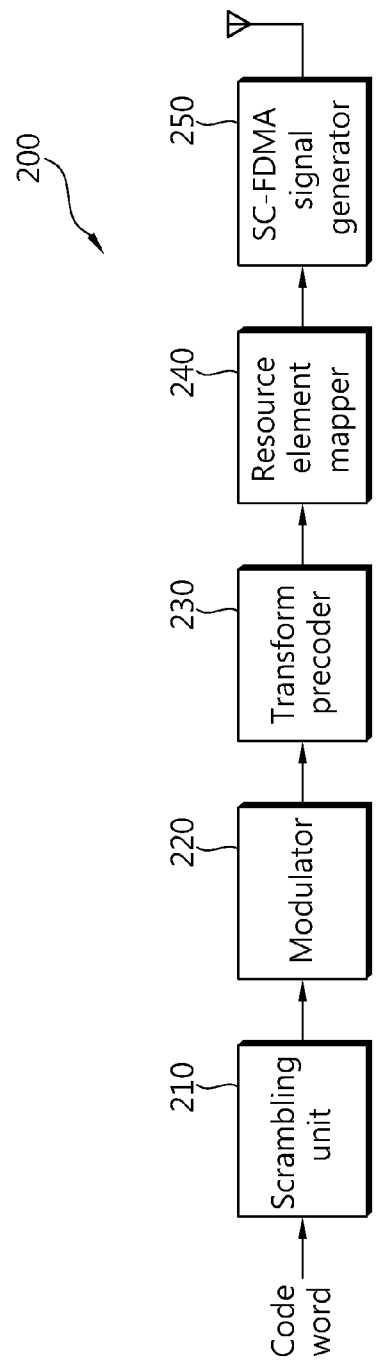
FIG. 6 shows another exemplary structure of a transmitter.

FIG. 6 shows another exemplary structure of a transmitter. This structure can be used for UL transmission using an SC-FDMA access scheme.

Referring to FIG. 6, a transmitter 200 includes a scrambling unit 210, a modulator 220, a transform precoder 230, a resource element mapper 240, and an SC-FDMA signal generator 250.

The scrambling unit 210 performs scrambling on an input codeword. The codeword may have a length corresponding to the number of bits transmitted through a PUSCH of one subframe. The modulator 220 arranges the scrambled codeword to a modulation symbol that expresses a position on a signal constellation. There is no restriction on the modulation scheme, and thus m-PSK or m-QAM may be used as the modulation scheme. For example, QPSK, 16QAM, 64QAM, etc., can be used as the modulation scheme in the PUSCH.

A codeword d arranged to the modulation symbol on the signal constellation can be expressed by Equation 7 below.

$$d(0), \ldots, d(M_{symb} - 1) \quad \text{[Equation 7]}$$

In Equation 7, $M_{symb}$ denotes the number of modulation symbols of the codeword d.

The transform precoder 230 divides the codeword d arranged to the modulation symbol on the signal constellation into $M_{symb}/M_{sc}^{PUSCH}$ sets, and matches each set to one SC-FDMA symbol. $M_{sc}^{PUSCH}$ denotes the number of subcarriers included in a bandwidth for UL transmission, and may correspond to a DFT size. The transform precoder 230 generates a DFT symbol in a frequency domain by performing DFT according to Equation 8 below.

$$z(l \cdot M_{sc}^{PUSCH} + k) = \frac{1}{\sqrt{M_{sc}^{PUSCH}}} \sum_{i=0}^{M_{sc}^{PUSCH}-1} d(l \cdot M_{sc}^{PUSCH} + i) e^{-j\frac{2\pi i k}{M_{sc}^{PUSCH}}} \quad \text{[Equation 8]}$$

$$k = 0, \ldots, M_{sc}^{PUSCH} - 1$$

$$l = 0, \ldots, M_{symb}/M_{sc}^{PUSCH} - 1$$

In Equation 8, k denotes a frequency-domain index and l denotes a time-domain index. A resource element is denoted by (k,l). A DFT symbol derived from Equation 8 is output such as $z(0), \ldots, z(M_{symb}-1)$. When $M_{RB}^{PUSCH}$ denotes the number of resource blocks included in a bandwidth scheduled for UL transmission and $N^{RB}_{sc}$ denotes the number of sub-carriers included in a resource block in the frequency domain, then it is expressed as $M^{PUSCH}_{sc}=M^{PUSCH}_{RB} N^{RB}_{sc}$. $M^{PUS-CH}_{RB}$ is applied as expressed by Equation 9 below.

$$M_{RB}^{PUSCH}=2^{\alpha_2}3^{\alpha_3}5^{\alpha_5} \leq N_{RB}^{UL} \quad \text{[Equation 9]}$$

In Equation 9, $\alpha_2$, $\alpha_2$, and $\alpha_5$ belong to a set of non-negative integers.

The resource element mapper 240 maps DFT symbols $z(0), \ldots, z(M_{symb}-1)$ output from the transform precoder 230 to a resource element. The SC-FDMA signal generator 250 generates an SC-FDMA signal of a time domain for each antenna. The SC-FDMA signal is transmitted through a Tx antenna.

Now, a method capable of implementing Tx diversity while maintaining a low cubic metric (CM) of a single carrier will be described. The number of layers can be determined according to a transmission scheme. A DFT number (or a transform precoding number) can be determined according to the number of layers. Therefore, a precoding length can be determined according to the transmission scheme. A modulation symbol is mapped to the determined layer.

Table 3 shows an example of the number of layers according to the transmission scheme. The present invention is not restricted by the transmission scheme, and thus various transmission schemes can be used in addition to the transmission schemes included in Table 3.

TABLE 3

| Number of layers | Example of transmission schemes |
|---|---|
| 1 | CDD, PVS, FSTD, Beamforming, Rank 1 precoded SM, Etc |
| 2 | STBC, SFBC, FSTD, STBC + CDD, STBC + PVS, SFBC + CDD, SFBC + PVS, Dual stream beamforming, Rank 2 precoded SM, Etc |
| 3 | Rank 3 preoced SM, Etc |
| 4 | FSTD, STBC + FSTD, SFBC + FSTD, Rank 4 preoced Spatial multiplexing, etc |

For example, spatial multiplexing, STBC, SFBC, and FSTD for two Tx antennas can be performed by using two layers, and modulation symbols are mapped to the two layers in a divisive manner. The number of modulation symbols in the two layers can be expressed by $M^{layer}_{symb}=M^{(0)}_{symb}/2$. According to the transmission scheme, the length of transform precoding can be determined.

DFT is performed one time in single-layer transmission, which is called single-DFT. DFT is performed several times in multi-layer transmission, which is called multi-DFT.

Figure 7:
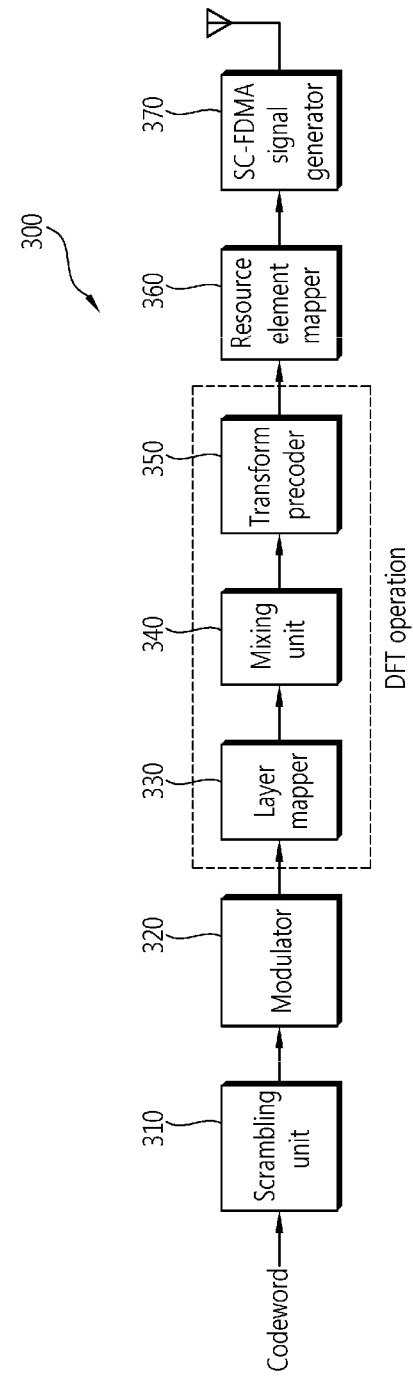
FIG. 7 shows a structure of a transmitter performing single-discrete Fourier transform (DFT) according to an embodiment of the present invention.

FIG. 7 shows a structure of a transmitter performing single-DFT according to an embodiment of the present invention.

Referring to FIG. 7, a transmitter 300 includes a scrambling unit 310, a modulator 320, a layer mapper 330, a mixing unit 340, a transform precoder 350, a resource element mapper 360, and an SC-FDMA signal generator 370. The single-DFT is performed by the layer mapper 330, the mixing unit 340, and the transform precoder 350.

The scrambling unit 310 performs scrambling on an input codeword. The modulator 320 arranges the scrambled codeword to a modulation symbol that expresses a position on a signal constellation. There is no restriction on the modulation scheme, and thus m-PSK or m-QAM may be used as the modulation scheme. A symbol modulated to a complex value for the codeword q can be expressed by Equation 10 below.

$$d^{(q)}(0), \ldots, d^{(q)}(M_{symb}^{(q)}-1) \quad \text{[Equation 10]}$$

The layer mapper 330 maps the modulation symbol for the codeword q to a path of each antenna. A symbol x input to the path of each antenna can be expressed by Equation 11 below.

$$x(i)=[x^{(0)}(i) \ldots x^{(v-1)}(i)]^T \quad \text{[Equation 11]}$$

In Equation 11, $i=0, 1, \ldots, M^{layer}_{symb}-1$. $v$ denotes the number of layers, and $M^{layer}_{symb}$ denotes the number of modulation symbols per layer. $v=1$ is used in single layer, and mapping for the single layer is defined by Equation 12 below.

$$x^{(0)}(i)=d^{(0)}(i) \quad \text{[Equation 12]}$$

In Equation 12, $M^{layer}_{symb}=M^{(0)}_{symb}$.

In the single layer, the modulation symbol is equivalent to the symbol mapped to the layer. Therefore, layer mapping of the codeword may not be performed, and the symbol modulated to the complex value may be directly mapped to the transform precoder 350. That is, the layer mapper 330 can be omitted.

The mixing unit 340 mixes and sorts modulation symbols mapped to respective layers according to a predetermined rule in order to obtain a diversity gain. The sorted modulation symbols can be expressed by Equation 13 below.

$$\hat{x}(i)=x^{(0)}(i) \quad \text{[Equation 13]}$$

In Equation 13, $i=0, 1, \ldots, M_{symb}-1$.

The modulation symbols mapped to the respective layers can be sorted continuously. That is, the process of mixing the modulation symbols can be omitted. This can be used in beamforming, rank-1 precoding spatial multiplexing, small delay CDD, precoding vector switching (PVS), FSTD, etc., and can also be applied to other Tx diversity schemes.

The transform precoder 350 performs DFT on the modulation symbol to generate a DFT symbol of a frequency domain. The transform precoder 350 performs a transform precoding process for generating the DFT symbol of the frequency domain. In a method of performing DFT proposed to obtain a low CM or a lower CM gain, a plurality of modulation symbol blocks are selected in a time domain as a modulation symbol of a codeword before transform precoding, and the selected modulation symbol blocks are repetitively combined and are then subjected to transform precoding. The selection and repetition of the modulation symbols in the time domain can be performed by the layer mapper 330. The repeated modulation symbols can be combined in the mixing unit 340. Alternatively, if the layer mapper 330 and the mixing unit 340 are omitted, the transform precoder 350 can perform DFT in such a manner that the modulation symbols are selected and repeated in the time domain and then the repeated modulation symbols are combined.

The resource element mapper 360 maps the DFT symbol output from the transform precoder 350 to a physical resource element. The SC-FDMA signal generator 370 generates an SC-FDMA signal of the time domain for each antenna from the DFT symbol mapped to the physical resource element. The SC-FDMA signal is transmitted through a Tx antenna.

In order to obtain the low CM or the lower CM gain, after performing the transform precoding process, the symbols are allocated in the frequency domain in an interleaved type, a localized type, a clustered type, etc. The interleaved type is a method in which the symbols are allocated to equidistantly-spaced subcarriers in a full system bandwidth. The localized type is a method in which the symbols are allocated to locally-contiguous subcarriers in the full system bandwidth. The clustered type is a method in which the symbols are allocated to equidistantly-spaced subcarriers or subcarriers spaced with any distance in a locally contiguous subcarrier set.

When using Tx diversity of FSTD, the symbols after the transform precoding process are distributed to physical antennas. The symbol distributed to each physical antenna has a length smaller than an allocated bandwidth. A region in which no data is carried in the allocated bandwidth is filled with zero. Accordingly, a PAPR or a CM can be increased due to the symbol distributed to each physical antenna.

There is a need for a method of performing DFT to obtain a low CM or a lower CM gain. DFT is performed by the layer mapper 330, the mixing unit 340, and the transform precoder 350. Optionally, the layer mapper 330 and the mixing unit 340 can be omitted.

Figure 8:
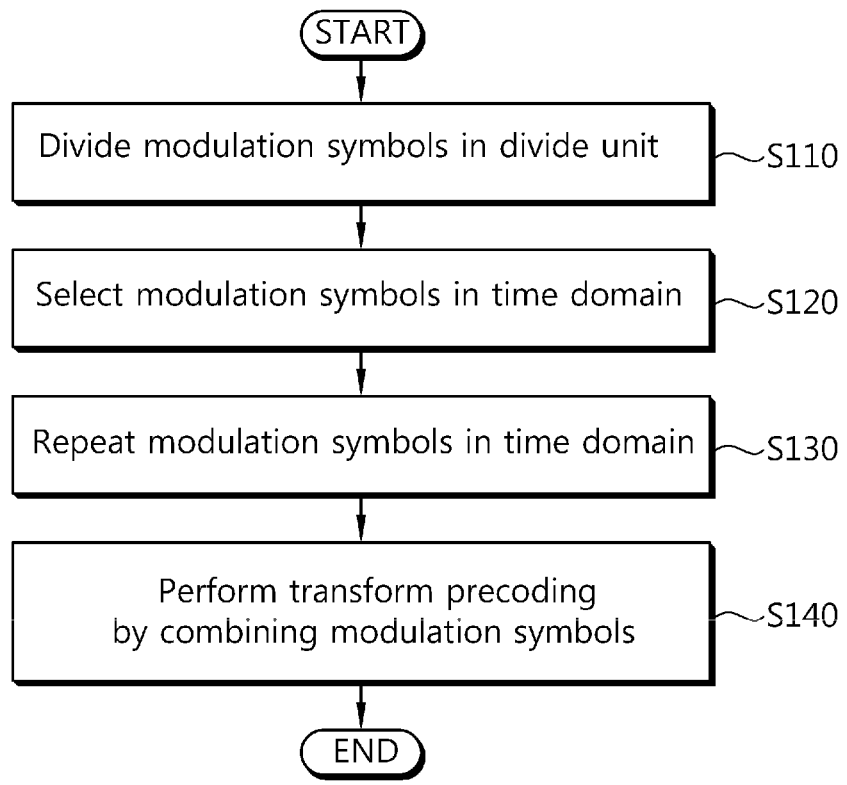
FIG. 8 is a flowchart showing a method of performing DFT according to an embodiment of the present invention.

FIG. 8 is a flowchart showing a method of performing DFT according to an embodiment of the present invention.

Referring to FIG. 8, modulation symbols can be divided in a divide unit for transform precoding (step S110). A length of the divide unit may be equal to a length of a transform precoder, may be an integer multiple of the length of the transform precoder, or may be less than or greater than the length of the transform precoder. If the length of the divide unit is equal to the length of the modulation symbol, a process of dividing the modulation symbols may not be performed. The divided symbols may correspond to one SC-FDMA symbol.

Before performing transform precoding, a modulation symbol is selected in a time domain (step S120). N modulation symbol blocks can be selected from total modulation symbols of a codeword (where N is integer satisfying N>0). That is, the modulation symbol can be selected N times in the time domain. A length of the modulation symbol block may be less than a length of the transform precoder or may be equal to the divide unit. The modulation symbol block can be selected within a total length of the modulation symbol. As a method of selecting the modulation symbol block, the interleaved type, the localized type, the clustered type, or the like can be used. The interleaved type is that equidistantly-spaced modulation symbols are selected from the total modulation symbols. The localized type is that contiguous modulation symbols are selected from the total modulation symbols. The clustered type is that the equidistantly-spaced modulation symbols are selected in some regions of the total modulation symbols.

A selection region of the modulation symbol block may be equal to the divide unit or a smaller region than the divide unit or a total length of the modulation symbol.

The modulation symbol block is repeated in the time domain (step S130). A total length of the repeated modulation symbol block may be equal to the length of the transform precoder. The process of selecting and repeating the modulation symbol block may be performed N times (where N is integer satisfying N>0). N may be equal to the number of layers, or may be equal to a length of a scheduling bandwidth divided by the length of the modulation symbol block. When the modulation symbol block is repeated, any phase may be multiplied to each modulation symbol block so that the modulation symbol block does not overlap in a frequency domain. Alternatively, any phase may be multiplied according to the divide unit. Alternatively, a linear phase which increases or decreases depending on an index of the transform precoder may be multiplied. Alternatively, a linear phase which increases or decreases depending on the divide unit may be multiplied.

Transform precoding is performed on the N repeated modulation symbol blocks by combining the modulation symbol blocks (step S140). The length of the transform precoder may be equal to the number of subcarriers at the scheduling bandwidth. The transform precoding performed on the combined N repeated modulation symbol blocks may be performed one time.

The modulation symbols may be repeated in the time domain by being selected in the interleaved type, and the repeated symbols may be combined and mapped by being interleaved in the frequency domain. This can be expressed by Equation 14 below.

$$\hat{x}(l \cdot M_{sc}^{PUSCH} + i) = \qquad \text{[Equation 14]}$$
$$\frac{1}{N} \sum_{n=0}^{N-1} x^{(0)}(l \cdot M_{SC}^{PUSCH} + N \cdot m + n) e^{j\frac{2\pi \cdot n \cdot i}{M_{SC}^{PUSCH}}}$$
$$M_{sc}^{DivideUnit} = M_{SC}^{PUSCH}/N$$
$$i = 0, 1, \ldots, M_{SC}^{PUSCH} - 1$$
$$m = \mathrm{mod}(i, M_{sc}^{DivideUnit})$$
$$l = 0, \ldots, M_{symb}/M_{sc}^{PUSCH} - 1$$

In Equation 14, $x^{(0)}$ denotes a modulation symbol after layer mapping of the codeword, $\hat{x}$ denotes a modulation symbol after performing a mixing process, N denotes the number of times of performing a selection process, and $$e^{j\frac{2\pi n i}{M_{SC}^{PUSCH}}}$$

denotes phase modulation of a selected symbol.

If N=2, Equation 15 shows a case where a modulation symbol selected in the interleaved type in the time domain is mapped by being interleaved in the frequency domain.

$$\hat{x}(l \cdot M_{SC}^{PUSCH} + i) = \frac{1}{2} \bigg( x^{(0)}(l \cdot M_{SC}^{PUSCH} + 2 \cdot m) + \qquad \text{[Equation 15]}$$
$$x^{(0)}(l \cdot M_{SC}^{PUSCH} + 2 \cdot m + 1) e^{j\frac{2\pi \cdot 1 \cdot i}{M_{SC}^{PUSCH}}} \bigg)$$

If N=2, odd symbols, i.e., $(2m+1)^{th}$ symbols, and even symbols, i.e., $(2m)^{th}$ symbols, are selected in the interleaved type among modulation symbols of the time domain. The selected odd symbols and even symbols are phase-modulated differently, are combined while avoiding overlapping, and are subjected to transform precoding.

The modulation symbols may be repeated by being selected in the localized type in the time domain, and N blocks of the repeated symbols may be combined and then be mapped by being interleaved in the frequency domain. This can be expressed by Equation 16 below.

$$\hat{x}(l \cdot M_{SC}^{PUSCH} + i) = \qquad \text{[Equation 16]}$$
$$\frac{1}{N} \sum_{n=0}^{N-1} x^{(0)}(l \cdot M_{SC}^{PUSCH} + m + n \cdot M_{SC}^{DivideUnit}) e^{j\frac{2\pi \cdot n \cdot i}{M_{SC}^{PUSCH}}}$$
$$M_{sc}^{DivideUnit} = M_{SC}^{PUSCH}/N$$
$$i = 0, 1, \ldots, M_{SC}^{PUSCH} - 1$$
$$m = \mathrm{mod}(i, M_{sc}^{DivideUnit})$$
$$l = 0, \ldots, M_{symb}/M_{sc}^{PUSCH} - 1$$

If N=2, Equation 17 shows a case where a modulation symbol selected in the localized type in the time domain is mapped by being interleaved in the frequency domain.

$$\hat{x}(l \cdot M_{SC}^{PUSCH} + i) = \frac{1}{2}\left(x^{(0)}(l \cdot M_{SC}^{PUSCH} + m) + x^{(0)}(l \cdot M_{SC}^{PUSCH} + m + M_{SC}^{PUSCH}/2)e^{j\frac{2\pi \cdot i}{M_{SC}^{PUSCH}}}\right)$$ [Equation 17]

In addition to Equation 14 to Equation 17, the method of selecting the modulation symbol in the time domain and the method of mapping the modulation symbol in the frequency domain can be applied in various manners. For example, modulation symbols may be selected in the interleaved type in the time domain, and may be mapped locally in the frequency domain. Alternatively, modulation symbols may be selected in the localized type in the time domain, and may be mapped locally in the frequency domain.

In case of single-DFT, the size of the transform precoder may be equal to the number of subcarriers at the scheduling bandwidth. Modulation symbols $\hat{x}(0), \ldots, \hat{x}(M_{symb}-1)$ may be divided into $M_{symb}/M^{PUSCH}_{sc}$ sets, and each set may correspond to one SC-FDMA symbol.

The transform precoding can be applied by Equation 18 below.

$$z(l \cdot M_{sc}^{PUSCH} + k) = \frac{1}{\sqrt{M_{sc}^{PUSCH}}} \sum_{i=0}^{M_{sc}^{PUSCH}-1} d(l \cdot M_{sc}^{PUSCH} + i)e^{-j\frac{2\pi i k}{M_{sc}^{PUSCH}}}$$ [Equation 18]

$$k = 0, \ldots, M_{sc}^{PUSCH} - 1$$

$$l = 0, \ldots, M_{symb}/M_{sc}^{PUSCH} - 1$$

In Equation 18, k denotes a frequency-domain index and l denotes a time-domain index. A resource element is denoted by (k,l). A DFT symbol is output such as $z(0), \ldots, z(M_{symb}-1)$. When $M^{PUSCH}_{RB}$ denotes the number of resource blocks included in a bandwidth scheduled for UL transmission and $N^{RB}_{sc}$ denotes the number of subcarriers included in a resource block in the frequency domain, then it is expressed as $M^{PUSCH}_{sc} = M^{PUSCH}_{RB} N^{RB}_{sc}$. $M^{PUSCH}_{RB}$ denotes a bandwidth of PUSCH in a resource block, and can be expressed by Equation 19 below.

$$M_{RB}^{PUSCH} = 2^{\alpha_2} 3^{\alpha_3} 5^{\alpha_5} \leq N_{RB}^{UL}$$ [Equation 19]

In Equation 19, $\alpha_2$, $\alpha_3$, and $\alpha_5$ belong to a set of non-negative integers.

DFT symbols $z(0), \ldots, z(M_{symb}-1)$ are output through the transform precoding, and the DFT symbols are mapped to a physical resource element to generate an SC-FDMA signal of the time domain. Since the SC-FDMA signal is generated when the modulation symbols are mapped by being interleaved in the frequency domain, a low CM or a lower CM gain can be obtained.

Meanwhile, when modulation symbols are selected in the interleaved type or the localized type in the time domain, DFT may be performed without repeating the selected symbols in the time domain, and the generated DFT symbols may be mapped while avoiding overlapping in the frequency domain. Since the DFT symbols are mapped by being interleaved in the frequency domain, an SC-FDMA signal with a low CM can be generated.

In addition, when modulation symbols are repeated by being selected in the interleaved type or the localized type in the time domain, DFT may be performed by multiplying a negative phase modulation value to any one repeated part. When DFT is performed by multiplying the negative phase modulation value to any one repeated part, DFT symbols can be mapped by being interleaved in the frequency domain.

In addition, when modulation symbols are selected in the interleaved type or the localized type in the time domain, DFT may be performed by inserting zero to a position of a non-selected modulation symbol. When DFT is performed by inserting zero to the position of the non-selected modulation symbol, DFT symbols are repetitively output. Among the repeated DFT symbols, only necessary parts can be mapped while avoiding overlapping in the frequency domain.

The aforementioned DFT methods are not limited to a particular transmission scheme, and thus can be applied to various transmission schemes.

Figure 9:
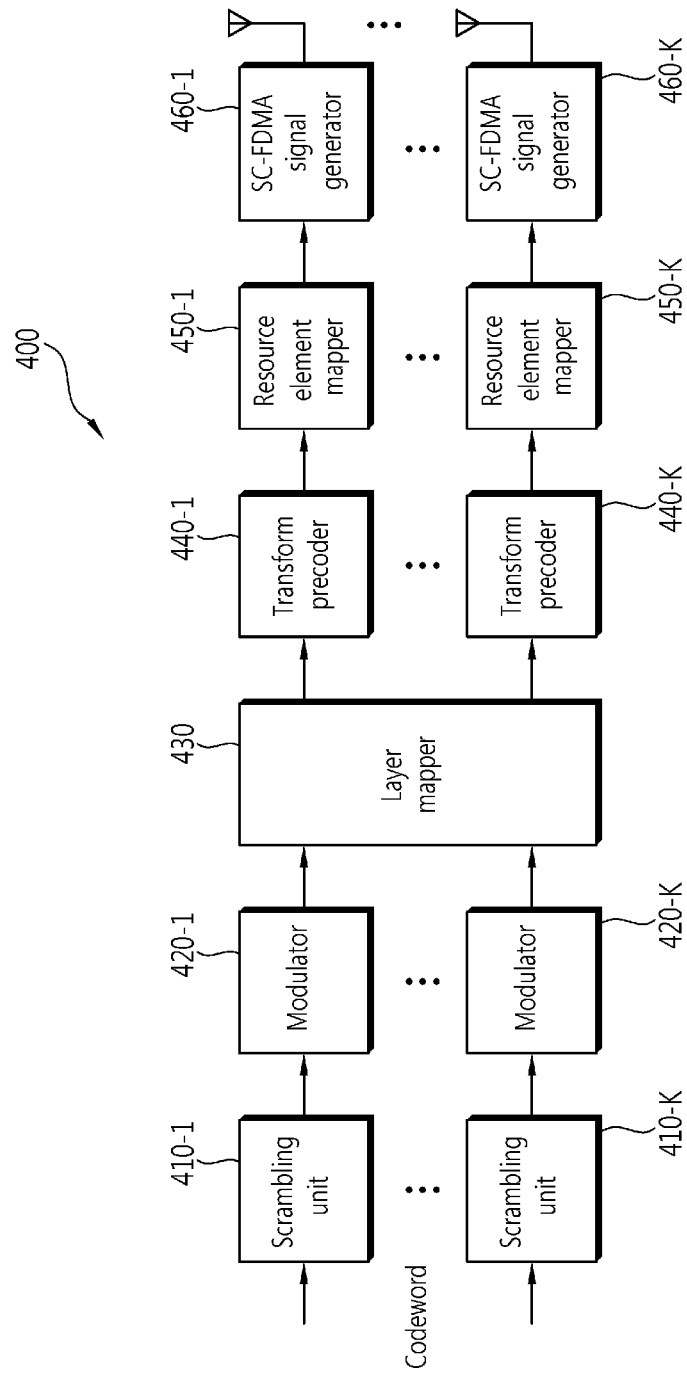
FIG. 9 shows a structure of a transmitter performing multi-DFT according to an embodiment of the present invention.

FIG. 9 shows a structure of a transmitter performing multi-DFT according to an embodiment of the present invention.

Referring to FIG. 9, a transmitter 400 includes scrambling units 410-1, ..., 410-K, modulators 420-1, ..., 420-K, a layer mapper 430, transform precoders 440-1, ..., 440-K, resource element mappers 450-1, ..., 450-K, and SC-FDMA signal generators 460-1, ..., 460-K.

Each of the scrambling units 410-1, ..., 410-K performs scrambling on an input codeword. Each of the modulators 420-1, ..., 420-K arranges the scrambled codeword to a modulation symbol that expresses a position on a signal constellation. A modulation symbol generated from each of the modulators 420-1, ..., 420-K can be output according to Equation 10.

The layer mapper 430 maps the modulation symbol for the codeword q to a path of each antenna. A symbol x input to the path of each antenna can be expressed by Equation 11. For spatial multiplexing, the codeword may be mapped according to Table 1. For Tx diversity, layer mapping may be performed on the codeword according to Table 2. A single codeword is used, and the number of layers may be equal to or different from the number P of antennas used to transmit a physical channel.

The transform precoders 440-1, ..., 440-K may be a different length according to a transmission method. For example, modulation symbols of the respective layers can be expressed by $x^{(v)}(0), \ldots, x^{(v)}(M^{layer}_{symb}-1)$, the modulation symbols of the respective layers can be divided into $M^{layer}_{symb}/M^{PUSCH}_{sc}$ sets, and each set can correspond to one SC-FDMA symbol.

The transform precoders 440-1, ..., 440-K of the respective layers perform DFT to generate DFT symbols of the frequency domain. Transform precoding of each layer can be performed according to Equation 20.

$$z^{(v)}(l \cdot M_{SC}^{PUSCH} + k) = \frac{1}{\sqrt{M_{sc}^{PUSCH}}} \sum_{i=0}^{M_{sc}^{PUSCH}-1} x^{(v)}(l \cdot M_{SC}^{PUSCH} + i)e^{-j\frac{2\pi k}{M_{SC}^{PUSCH}}}$$ [Equation 20]

$$k = 0, \ldots, M_{SC}^{PUSCH} - 1$$

$$l = 0, \ldots, M_{symb}/M_{sc}^{PUSCH} - 1$$

DFT symbols of the respective layers are output such as $z^{(v)}(0), \ldots, z^{(v)}(M_{symb}-1)$. If $M^{PUSCH}_{RB}$ denotes a bandwidth of PUSCH in a resource block, it is expressed as $M^{PUSCH}_{sc}=M^{PUSCH}_{RB} N^{RB}_{sc}$, and $M^{PUSCH}_{RB}$ satisfies Equation 21.

$$M_{RB}^{PUSCH}=2^{\alpha_2}3^{\alpha_3}5^{\alpha_5} \leq N_{RB}^{UL} \quad \text{[Equation 21]}$$

In Equation 21, $\alpha_2$, $\alpha_3$, and $\alpha_5$ belong to a set of non-negative integers.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for transmitting data in a multi-antenna system, the apparatus comprising:
   a scrambling unit for performing scrambling on an input codeword;
   a modulator for arranging the scrambled codeword to a modulation symbol that expresses a position on a signal constellation;
   a transform precoder for performing discrete Fourier transform (DFT) on the modulation symbol to generate a DFT symbol of a frequency domain;
   a resource element mapper for mapping the DFT symbol to a physical resource element; and
   a single carrier-frequency division multiple access (SC-FDMA) signal generator for generating an SC-FDMA signal of a time domain from the DFT symbol mapped to the resource element,
   wherein the modulation symbol is selected as a plurality of modulation symbol blocks in the time domain, and the selected modulation symbol blocks are input to the transform precoder after being combined repetitively.

2. The apparatus of claim 1, further comprising a layer mapper for selecting the plurality of modulation symbol blocks.

3. The apparatus of claim 1, further comprising a mixing unit for mixing the repeated modulation symbol blocks.

4. A method for transmitting data in a multi-antenna system, the method comprising:
   selecting a plurality of modulation symbol blocks including at least one modulation symbol from total modulation symbols of a codeword;
   repeating the plurality of modulation symbol blocks in a time domain;
   combining the repeated plurality of modulation symbol blocks; and
   performing discrete Fourier transform (DFT) on the combined plurality of modulation symbol blocks.

5. The method of claim 4, further comprising dividing the total modulation symbols of the codeword in a divide unit that can correspond to one single carrier-frequency division multiple access (SC-FDMA) symbol.

6. The method of claim 4, wherein equidistantly-spaced modulation symbols are selected from the total modulation symbols of the codeword.

7. The method of claim 4, wherein contiguous modulation symbols are selected from the total modulation symbols of the codeword.

8. The method of claim 4, wherein equidistantly-spaced modulation symbols are selected from some regions of the total modulation symbols of the codeword.

9. The method of claim 4, wherein a full length of the repeated modulation symbol block is equal to a length of a transform precoder that performs the DFT.

10. The method of claim 4, wherein the plurality of modulation symbol blocks are repeated by being multiplied by any phase for preventing overlapping in a frequency domain.

* * * * *